United States Patent
Sugaya

(10) Patent No.: US 10,623,578 B2
(45) Date of Patent: Apr. 14, 2020

(54) COMPUTER SYSTEM, METHOD FOR PROVIDING API, AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/771,555

(22) PCT Filed: Nov. 17, 2016

(86) PCT No.: PCT/JP2016/084028
§ 371 (c)(1),
(2) Date: Apr. 27, 2018

(87) PCT Pub. No.: WO2018/092226
PCT Pub. Date: May 24, 2018

(65) Prior Publication Data
US 2019/0342454 A1    Nov. 7, 2019

(51) Int. Cl.
*H04M 7/00* (2006.01)
*G06F 9/50* (2006.01)
(Continued)

(52) U.S. Cl.
CPC ........ *H04M 7/0021* (2013.01); *G06F 9/5055* (2013.01); *G06F 9/54* (2013.01); *H04W 88/18* (2013.01)

(58) Field of Classification Search
CPC ......... H04L 65/40; H04L 65/80; H04L 67/12; H04L 67/16; H04L 67/28; H04L 67/30;
(Continued)

(56) References Cited

U.S. PATENT DOCUMENTS

| 2006/0173872 | A1  | 8/2006 | Koike et al. |
| 2013/0132584 | A1* | 5/2013 | Palladino ............... H04L 65/40 709/226 |
| 2017/0126577 | A1* | 5/2017 | Sender .................. H04L 47/70 |

(Continued)

FOREIGN PATENT DOCUMENTS

| JP | 2006-190127 | 7/2006 |
| JP | 2013-114465 | 6/2013 |
| JP | 2014-222480 | 11/2014 |

OTHER PUBLICATIONS

Amazon Web Services (AWS)—Cloud Computing Services, http://aws.Amazon.com/jp/, English page: http://aws.Amazon.com, pp. 1-11, Apr. 27, 2018.
(Continued)

*Primary Examiner* — Nishant Divecha
(74) *Attorney, Agent, or Firm* — Lex IP Meister, PLLC

(57) ABSTRACT

The present invention is to provide a computer system, a method for providing an API, and a program that easily select an appropriate API. The computer system acquires sensor data from an edge device 100, selects an appropriate API for a calculation device 300 according to the acquired sensor data, uses the selected API for a calculation device 300 and controls the calculation device 300 to calculate, and provides the calculation result. The computer system selects an appropriate API for a calculation device 300 according to the acquired sensor data based on at least one of the fee for using, the processing speed, the user evaluation, the security, and the number of API users. Furthermore, the computer system previously receives the standard based on which an appropriate API for a calculation device 300 is selected from the user and selects an appropriate API for a calculation device 300 based on the standard. Furthermore, the computer system recommends the selected appropriate API for a
(Continued)

calculation device 300 to a user before the calculation control unit controls the calculation device 300 to calculate.

7 Claims, 12 Drawing Sheets

(51) Int. Cl.
*G06F 9/54* (2006.01)
*H04W 88/18* (2009.01)

(58) Field of Classification Search
CPC .......... H04L 67/42; H04L 67/02; H04W 8/18; H04W 12/009; H04W 88/18; G06F 17/40; G06F 9/54; G06F 9/5055; G06F 9/445; H04M 7/0021
See application file for complete search history.

(56) References Cited

U.S. PATENT DOCUMENTS

2017/0195458 A1* 7/2017 Parekh .................... G06F 9/547

OTHER PUBLICATIONS

T. Scheffler et al., "Integration of Place API", IPSJ SIG Technical Report, May 16, 2013, date of searching: Jan. 11, 2017, vol. 2013-MBL-066, No. 30, online, https://ipsj.ixsq.nii.ac.jp/ej/?action=repository_action_common_download&item_id=92398&item_no=1&attribute_id=1&file_no=1>, pp. 1-6, Information Processing Society of Japan.

* cited by examiner

FIG. 9

STANDARD DATA BASE

| Standard | Priority |
|---|---|
| Fee for using | 1 |
| Processing speed | 2 |
| User evaluation | 3 |
| Security | 4 |
| Number of API users | 5 |

FIG. 10

API DATABASE

| Type | Standard | Calculation device | API |
|---|---|---|---|
| A | Fee for using | AAA | A |
| | Processing speed | BBB | B |
| | User evaluation | AAA | C |
| | Security | AAA | D |
| | Number of API users | BBB | E |
| B | Fee for using | CCC | F |
| | Processing speed | BBB | G |
| | User evaluation | AAA | H |
| | Security | AAA | I |
| | Number of API users | CCC | J |
| ⋮ | ⋮ | ⋮ | ⋮ |

COMPUTER SYSTEM, METHOD FOR PROVIDING API, AND PROGRAM

TECHNICAL FIELD

The present invention relates to a computer system, a method for providing an API, and a program in cloud computing.

BACKGROUND ART

In recent years, for the cloud solutions that companies offer, an application programming interface (hereinafter referred to as "API") that is an application processed in the communication between an edge device and a computer or between computers has performed various calculations.

As such cloud solutions that companies offer, a constitution for which an information system architect previously selects an API according to data to perform necessary processes is disclosed (see Non-Patent Document 1).

CITATION LIST

Non-Patent Literature

Non-Patent Document 1: https://aws.Amazon.com/jp/

SUMMARY OF INVENTION

However, for the constitution of Non-Patent Document 1, an information system architect has to select an API that the system executes. Therefore, appropriate APIs are not always selected if two or more APIs exist. Furthermore, calculation devices provide a different API in each company, and therefore it is not easy to select an appropriate API in consideration of other computers.

Accordingly, for the present invention, the inventor looked at the point that an appropriate API only has to be selected according to sensor data to be acquired because the sensor data are also determined when the edge device is determined. The inventor also looked at the point that the API only has to be determined based on the combination of the acquired sensor data if two or more edge devices exist or if two or more sensor data are acquired from one edge device.

An objective of the present invention is to provide a computer system, a method for providing an API, and a program that easily select an appropriate API.

The present invention provides a computer system including:

a sensor data acquisition unit that acquires sensor data from an edge device;

an API selection unit that selects an appropriate API for a calculation device according to the acquired sensor data;

a calculation control unit that uses the selected API for a calculation device and controls the calculation device to calculate; and a calculation result providing unit that provides the calculation result.

According to the present invention, the computer system acquires sensor data from an edge device, selects an appropriate API for a calculation device according to the acquired sensor data, uses the selected API for a calculation device and controls the calculation device to calculate, and provides the calculation result.

The present invention is the category of a computer system, but the categories of a method for providing an API, a program, etc. have similar functions and effects.

The present invention can provide a computer system, a method for providing an API, and a program that easily select an appropriate API.

BRIEF DESCRIPTION OF DRAWINGS

FIG. 9 shows one example of the standard database.

FIG. 10 shows one example of the API database.

DESCRIPTION OF EMBODIMENTS

Embodiments of the present invention will be described below with reference to the attached drawings. However, this is illustrative only, and the technological scope of the present invention is not limited thereto.

Overview of System for Providing an API 1

Figure 1:
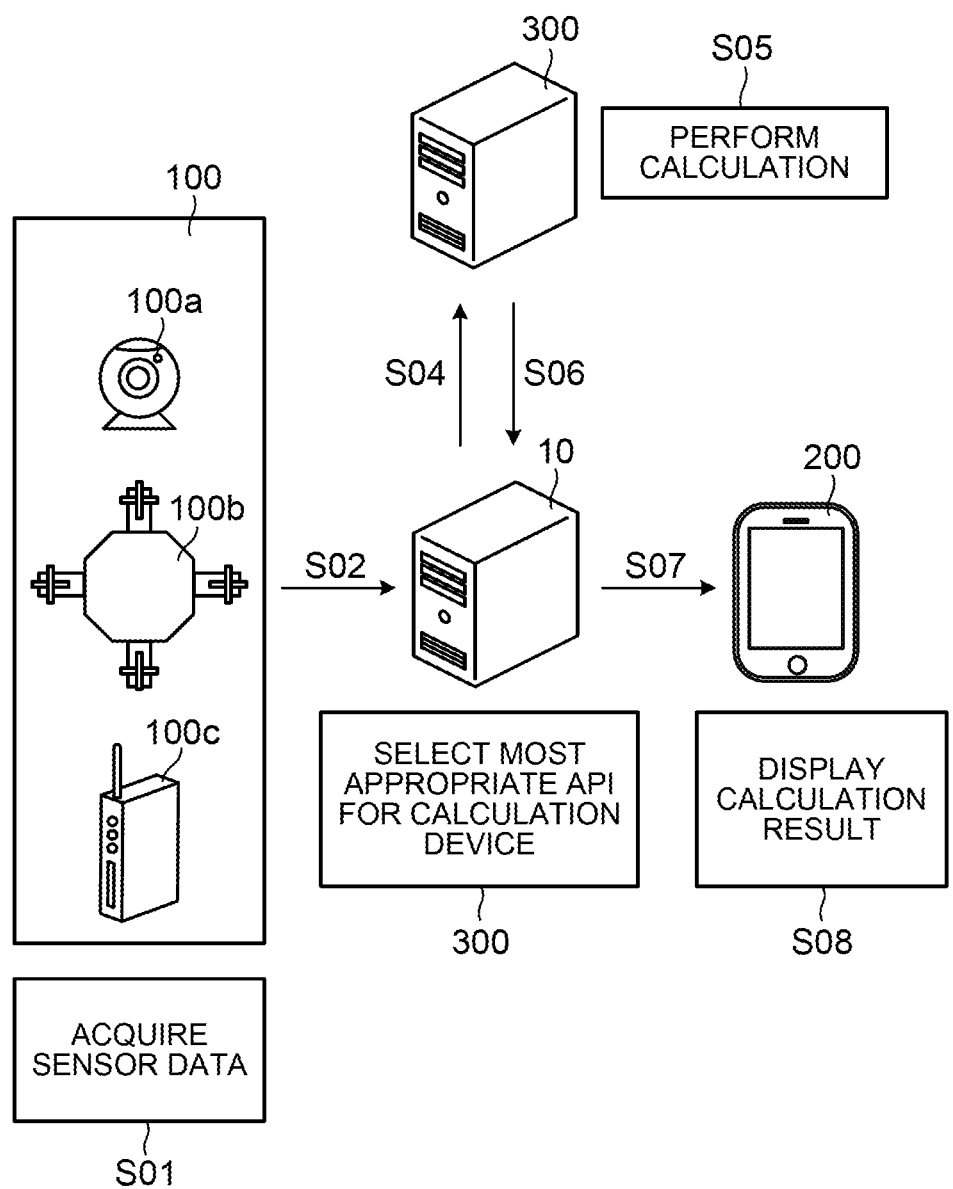
FIG. 1 shows a schematic diagram of the system for providing an API 1.

A preferable embodiment of the present invention will be described below with reference to FIG. 1. FIG. 1 shows an overview of the system for providing an API 1 according to a preferable embodiment of the present invention. The system for providing an API 1 includes a computer 10, an edge device 100 (e.g., a network camera 100a, a drone 100b, a sensor device 100c), a user terminal 200, and a calculation device 300.

The computer 10 is a computer device data-communicatively connected with the edge device 100, and the user terminal 200, and the calculation device 300.

The edge device 100 is a network device data-communicatively connected with the computer 10. Examples of the edge device 100 include wearable terminals such as smart glasses and a head mounted display, an uninhabited airborne vehicle such as a drone, an imaging device that takes an image such as a moving or still image, and a sensor device that detects environmental data including various spatial or time information.

The user terminal 200 is a terminal device data-communicatively connected with the computer 10. Examples of the user terminal 200 include electrical appliances such as a mobile phone, a mobile information terminal, a tablet terminal, a personal computer, a net book terminal, a slate terminal, an electronic book terminal, and a portable music player and wearable terminals.

The calculation device 300 is a computer device data-communicatively connected with the computer 10. The calculation device 300 stores an API and executes calculation.

The numbers of the computers 10, the edge devices 100, the user terminals 200, and the calculation devices 300 are not limited to the numbers shown in FIG. 1 and can be appropriately changed. Furthermore, the computer 10, the edge device 100, the user terminal 200, and the calculation device 300 are not limited to actual devices and may be virtual devices. The processes to be described later may be achieved by any one of or in combination of any two or more of the computer 10, the edge device 100, the user terminal 200, and the calculation device 300.

The edge device 100 acquires sensor data by acquiring environmental data, taking images, or other actions (Step S01). The sensor data means the environmental data, the image data, etc., that the edge device 100 acquires. The edge device 100 acquires environmental data from various sensors. Furthermore, the edge device 100 acquires image data on images taken by an imaging device.

The edge device 100 transmits the acquired sensor data to the computer 10 (Step S02).

The computer 10 receives the sensor data. The computer 10 selects an appropriate API for a calculation device 300 according to the received sensor data (Step S03). The computer 10 receives and acquires the sensor data. If acquiring one sensor datum, the computer 10 refers to the database in which an identifier that identifies the type, the name, etc., of sensor data is associated with an appropriate API for a calculation device 300 to select an appropriate API for a calculation device 300. If acquiring one or more sensor data from one or more edge devices 100, the computer 10 refers to the database in which the combination of the acquired sensor data is associated with an appropriate API for a calculation device 300 to select an appropriate API for a calculation device 300.

The computer 10 may previously receive the standards (e.g., the fee for using, the processing speed, the user evaluation, the security, the number of API users) based on which an appropriate API for a calculation device 300 is selected from the user and select an appropriate API for a calculation device 300 based on these standards and the sensor data. The computer 10 may select an appropriate API for a calculation device 300 based on at least one of the above-mentioned standards and the sensor data.

Furthermore, the computer 10 may recommend an API to the user by transmitting data on the selected appropriate API for a calculation device 300, which are API data (including the identifier such as the name, etc., of the API, the name of the calculation device 300, and the name, etc., of the provider) to the user terminal 200. In this case, the user terminal 200 recommends an appropriate API for a calculation device 300 to the user that is associated with the sensor data by displaying the recommendation screen that recommends an API based on the API data.

The computer 10 transmits a calculation instruction to instruct the calculation device 300 to calculate through the selected API to the calculation device 300 (Step S04).

The calculation device 300 receives the calculation instruction. The calculation device 300 performs necessary calculation based on the instruction (Step S05).

The calculation device 300 transmits the calculation result that is the result of the calculation based on the calculation instruction to the computer 10 as calculation result data (Step S06). The computer 10 receives and acquires the calculation result data.

The computer 10 provides the calculation result by transmitting the acquired calculation result data to the user terminal 200 (Step S07).

The user terminal 200 receives the provided calculation result data and displays the calculation result based on the calculation result data (Step S08).

Configuration of System for Providing an API 1

Figure 2:
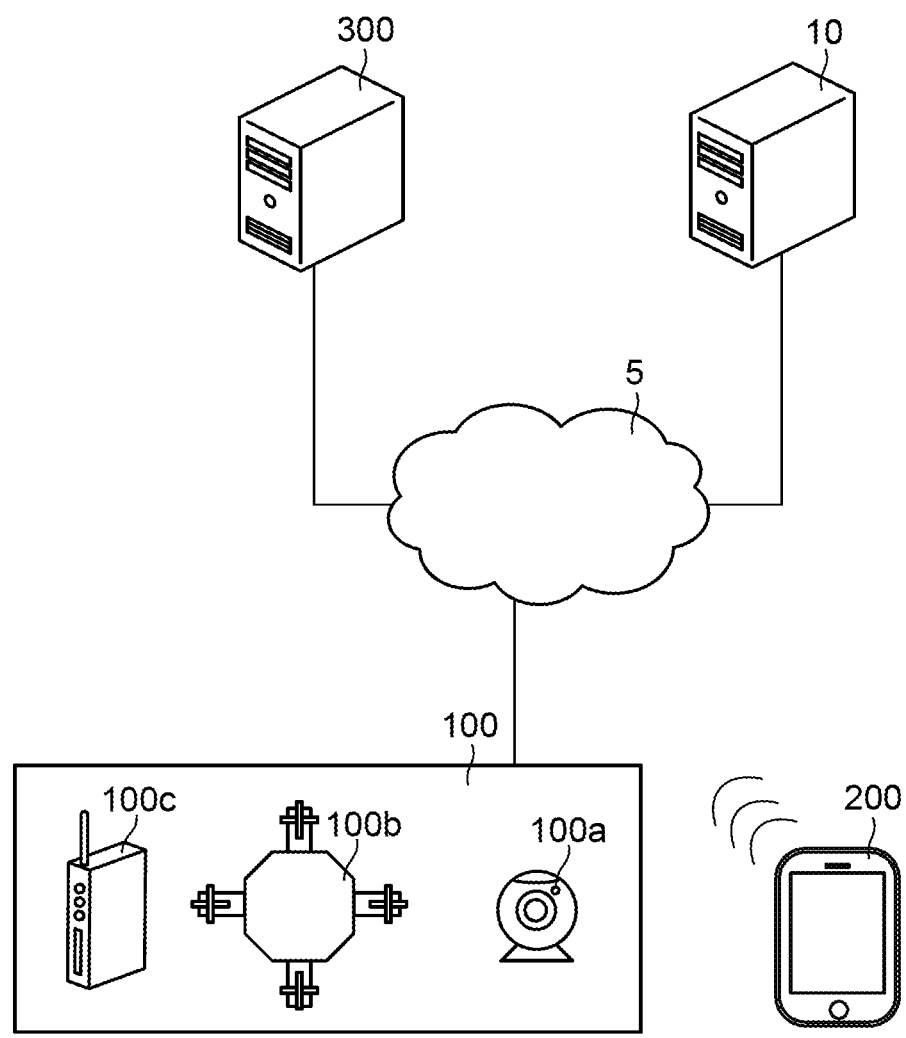
FIG. 2 shows an overall configuration diagram of the system for providing an API 1.

A system configuration of the system for providing an API 1 according to a preferable embodiment will be described below with reference to FIG. 2. FIG. 2 shows a block diagram illustrating the system for providing an API 1 according to a preferable embodiment of the present invention. The system for providing an API 1 includes a computer 10, an edge device 100 (e.g., a network camera 100a, a drone 100b, a sensor device 100c), a user terminal 200, a calculation device 300, and a public line network 5 (e.g., the Internet network, a third and a fourth generation networks).

The numbers of the computers 10, the edge devices 100, the user terminals 200, and the calculation devices 300 are not limited to the numbers shown in FIG. 2 and can be appropriately changed. Furthermore, the computer 10, the edge device 100, the user terminal 200, and the calculation device 300 are not limited to actual devices and may be virtual devices. The processes to be described later may be achieved by any one of or in combination of any two or more of the computer 10, the edge device 100, the user terminal 200, and the calculation device 300. The type of the edge device 100 is not limited to the above-mentioned examples and can be appropriately changed.

The computer 10 is the above-mentioned computer device with the functions to be described later.

The edge device 100 is the above-mentioned network device with the functions to be described later.

The user terminal 200 is the above-mentioned terminal device with the functions to be described later.

The calculation device 300 is the above-mentioned computer device with the functions to be described later.

Functions

Figure 3:
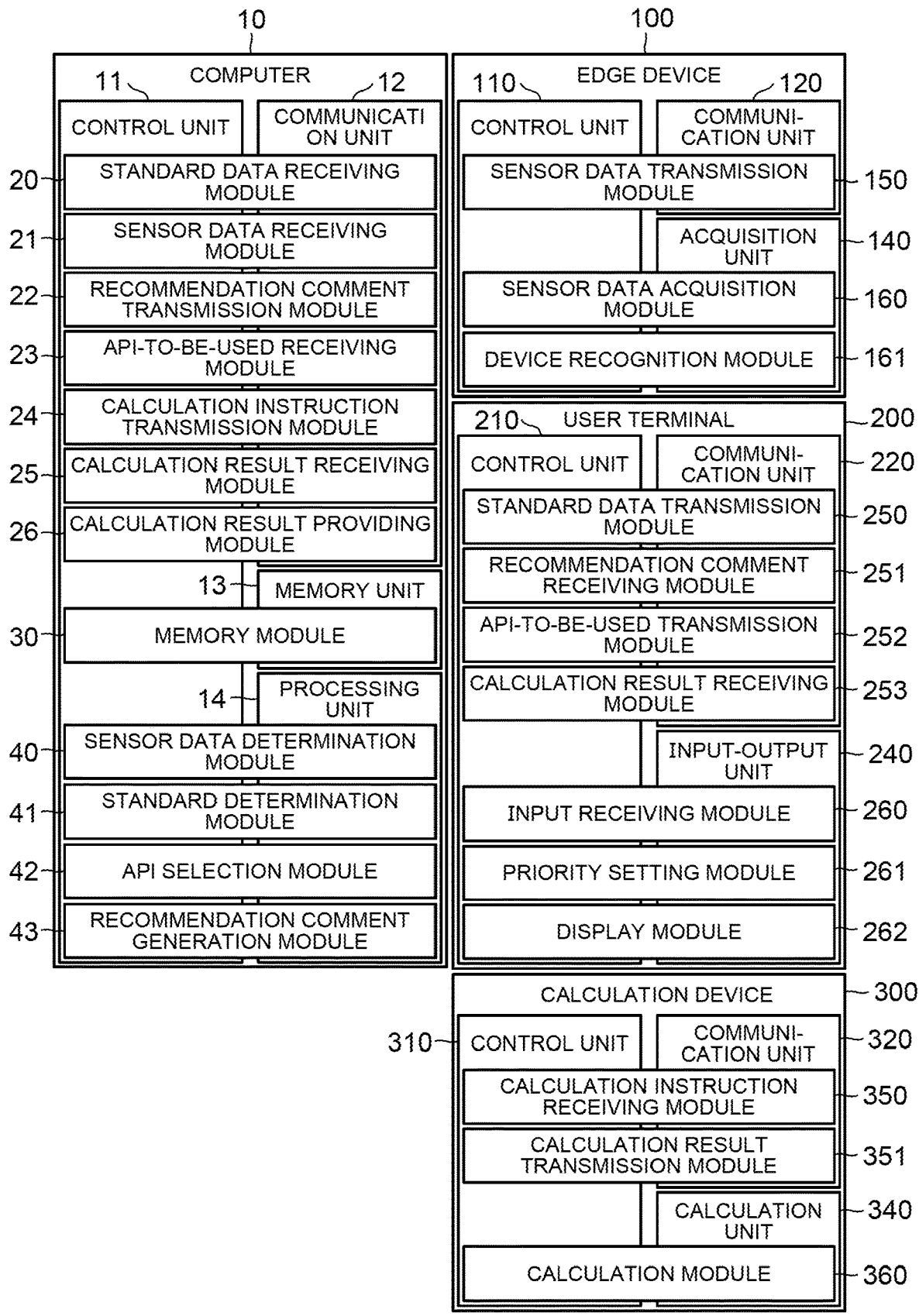
FIG. 3 shows a functional block diagram of the computer 10, the edge device 100, the user terminal 200, and the calculation device 300.

The functions of the system for providing an API 1 according to a preferable embodiment will be described below with reference to FIG. 3. FIG. 3 shows a functional block diagram of the computer 10, the edge device 100, the user terminal 200, and the calculation device 300.

The computer 10 includes a control unit 11 provided with a central processing unit (hereinafter referred to as "CPU"), a random access memory (hereinafter referred to as "RAM"), and a read only memory (hereinafter referred to as "ROM"); and a communication unit 12 such as a device that is capable to communicate with other devices (e.g., camera, sensor), for example, a Wireless Fidelity or Wi-Fi® enabled device complying with IEEE 802.11. The computer 10 also includes a memory unit 13 such as a hard disk, a semiconductor memory, a record medium, or a memory card to store data. The memory unit 13 stores various databases to be described later. The computer 10 also includes a processing unit 14 provided with a device, etc., that performs various processes including the selection of a calculation device 300 and an API.

In the computer 10, the control unit 11 reads a predetermined program to achieve a standard data receiving module 20, a sensor data receiving module 21, a recommendation comment transmission module 22, an API-to-be-used receiving module 23, a calculation instruction transmission module 24, a calculation result receiving module 25, and a calculation result providing module 26 in cooperation with the communication unit 12. Furthermore, in the computer 10, the control unit 11 reads a predetermined program to achieve a memory module 30 in cooperation with the memory unit 13. Furthermore, in the computer 10, the control unit 11 reads a predetermined program to achieve a sensor data determination module 40, a standard determination module 41, an API selection module 42, a recommendation comment generation module 43 in cooperation with the processing unit 14.

The edge device 100 includes a control unit 110 including a CPU, a RAM, and a ROM; and a communication unit 120 such as a device that is capable to communicate with other devices, in the same way as the computer 10. The edge device 100 also includes an acquisition unit 140 provided with various devices to acquire environmental data, image data, etc.

In the edge terminal 100, the control unit 110 reads a predetermined program to achieve a sensor data transmission module 150 in cooperation with the communication unit 120. Furthermore, in the edge device 100, the control unit 110 reads a predetermined program to achieve a sensor data acquisition module 160 and a device recognition module 161 in cooperation with the acquisition unit 140.

The user terminal 200 includes a control unit 210 including a CPU, a RAM, and a ROM; and a communication unit 220 such as a device that is capable to communicate with other devices, in the same way as the computer 10. The user terminal 200 also includes an input-output unit 240 including a display unit that outputs and displays data and images processed by the control unit 210 and an input unit such as a touch panel, a keyboard, or a mouse that receive an input.

In the user terminal 200, the control unit 210 reads a predetermined program to achieve a standard data transmission module 250, a recommendation comment receiving module 251, an API-to-be-used transmission module 252, and a calculation result receiving module 253 in cooperation with the communication unit 220. Furthermore, in the user terminal 200, the control unit 210 reads a predetermined program to achieve an input receiving module 260, a priority setting module 261, and a display module 262 in cooperation with the input-output unit 240.

The calculation device 300 includes a control unit 310 including a CPU, a RAM, and a ROM; and a communication unit 320 such as a device that is capable to communicate with other devices, in the same way as the computer 10. The calculation device 300 also includes a calculation unit 340 such as a device that performs necessary calculation.

In the calculation device 300, the control unit 310 reads a predetermined program to achieve a calculation instruction receiving module 350 and a calculation result transmission module 351 in cooperation with the communication unit 320. Furthermore, in the calculation device 300, the control unit 310 reads a predetermined program to achieve a calculation module 360 in cooperation with the calculation unit 340.

Standard Receiving Process

Figure 4:
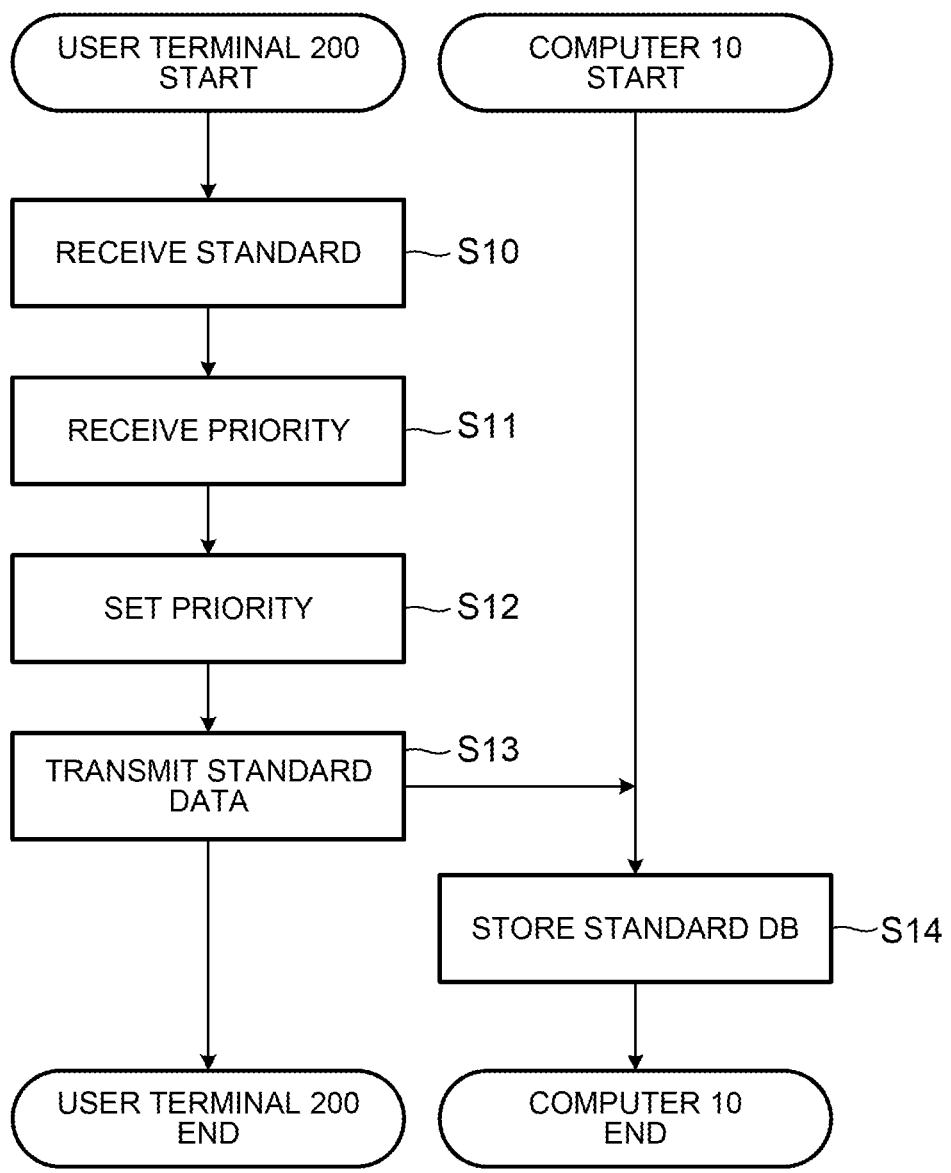
FIG. 4 shows a flow chart illustrating the standard receiving process performed by the computer 10 and the user terminal 200.

The standard receiving process performed by the system for providing an API 1 will be described below with reference to FIG. 4. FIG. 4 shows a flow chart illustrating the standard receiving process performed by the computer 10 and the user terminal 200. The tasks executed by the modules of each of the above-mentioned devices will be explained below together with this process.

The input receiving module 260 receives an input of the standard from the user to select an appropriate API for a calculation device 300 (Step S10). In the step S10, the input receiving module 260 receives the input of at least one of the fee for using, the processing speed, the user evaluation, the security, and the number of API users as the standard. The input receiving module 260 may receive each standard itself or receive the input of specific numerical values, information, etc. of the above-mentioned standards.

The fee for using is necessary for the use of API, which means necessary for the use of the predetermined number of times or the use for a predetermined period. The processing speed means the number of the instructions that the calculation device 300 can process per unit of time or the speed at which the calculation device 300 performs various processes. The user evaluation means the evaluation that the user or the other users carry out for the API for a calculation device 300. The security means the safety of the calculation device 300 or the API, specifically, the evaluation on the leak of information and the security robustness as the calculation device 300 or the API is used. The number of API users means the number of people that actually use the API.

The input receiving module 260 receives the input of the priority for the received standard (Step S11).

The priority setting module 261 sets a priority for the standard based on the received priority (Step S12). In the step S12, if receiving a priority for one standard, the priority setting module 261 sets a number for the standard as the priority. Specifically, "1" is set for the standard. If receiving priorities for two or more standards, the priority setting module 261 set a number for each of the standards as the priority. Specifically, "1," "2," "3," or larger numbers are set. If receiving priorities for two or more standards, the priority setting module 261 sets numbers in descending order according to priority.

The standard data transmission module 250 transmits the standard data indicating the received standard and the priority for this standard to the computer 10 (Step S13).

The standard data receiving module 20 receives the standard data. The memory module 30 stores the standard database based on the standard data (Step S14). In the step S14, the memory module 30 associates and stores the received standard with the numerical value set as the priority for this standard.

Standard Database

The standard database that the memory module 30 stores will be described below with reference to FIG. 9. FIG. 9 shows one example of the standard database. The memory module 30 associates and stores a standard with a priority in the standard database. The memory module 30 associates and stores the standard received in the step S11 with the priority received in the step S12. In FIG. 9, the memory module 30 stores "fee for using," "processing speed," "user evaluation," "security," and "number of API users" as the standards. The memory module 30 also stores "1," "2," "3," "4," and "5" as the priorities. The memory module 30 associates "fee for using" with "1." In the same way, the memory module 30 associates "processing speed," "user evaluation," "security," and "number of API users" with "2," "3," "4," and "5," respectively.

The memory module 30 may store standards and priorities other than the above-mentioned examples. The detail of each item can be appropriately changed. Furthermore, the memory module 30 may store the standard database for each or all of the users.

Sensor Data Acquisition Process

Figure 5:
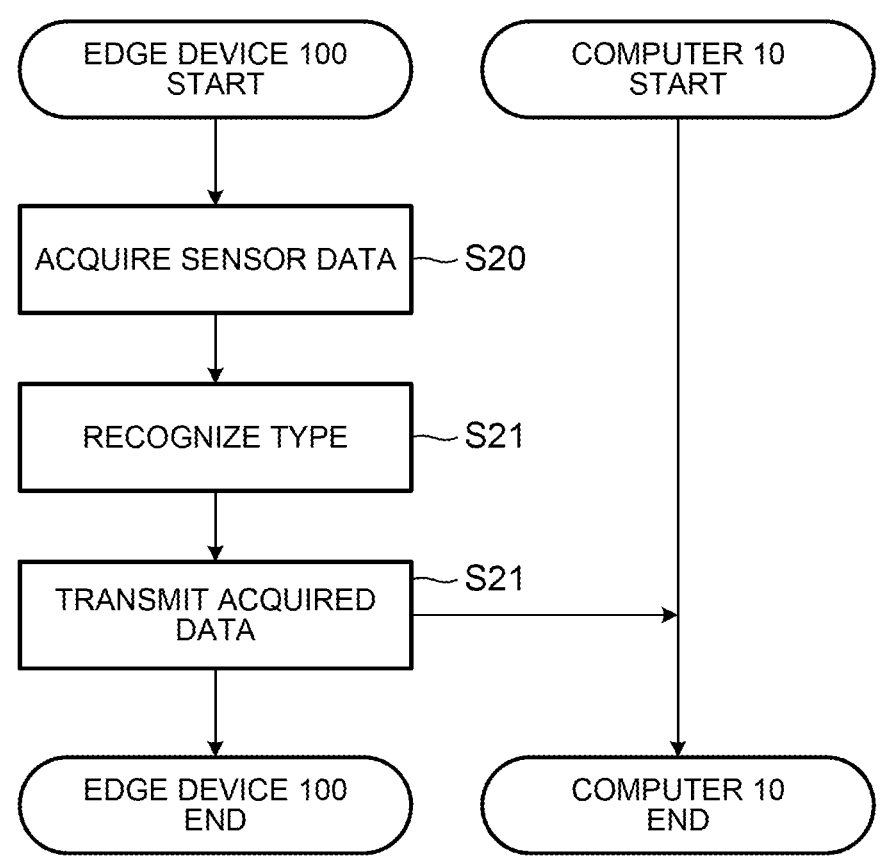
FIG. 5 shows a flow chart illustrating the sensor data acquisition process performed by the computer 10 and the edge device 100.

The sensor data acquisition process performed by the system for providing an API 1 will be described below with reference to FIG. 5. FIG. 5 shows a flow chart illustrating the sensor data acquisition process performed by the computer 10 and the edge devices 100. The tasks executed by the modules of each of the above-mentioned devices will be explained below together with this process.

The sensor data acquisition module 160 acquires sensor data (Step S20). In the step S20, the sensor data acquisition module 160 acquires environmental data including spatial and time information on the sunlight, temperature, humidity, etc. of the place or space where the edge device 100 is placed and image data on the images taken by the imaging device such as the camera that the edge device 100 owns as the sensor data. The sensor data acquisition module 160 acquires the sensor data at a predetermined timing (e.g., at a predetermined time or predetermined intervals, when receiving an acquisition instruction from the user terminal 200). The sensor data acquisition module 160 acquires one or more sensor data. The sensor data acquisition module 160 may acquire one or more sensor data from one or more edge devices 100. The sensor data acquisition module 160 may acquire data other than the above-mentioned data as the sensor data.

The device recognition module 161 recognizes the type of the edge device 100 that acquired sensor data this time (Step S21). In the step S21, the device recognition module 161 determines the identifier that recognizes the type of the edge device 100. The identifier that the device recognition module 161 recognizes can uniquely identifies the edge device 100, which is, for example, the device number, the IP address, the production number, or the MAC address, The sensor data transmission module 150 transmits the acquired sensor data and the recognized type of the edge device 100 to the computer 10 as the acquired data (Step S22).

The sensor data receiving module 21 receives the acquired data. The computer 10 acquires the sensor data and the type of the edge device 100 by receiving the acquired data.

API Selection Process

Figure 6:
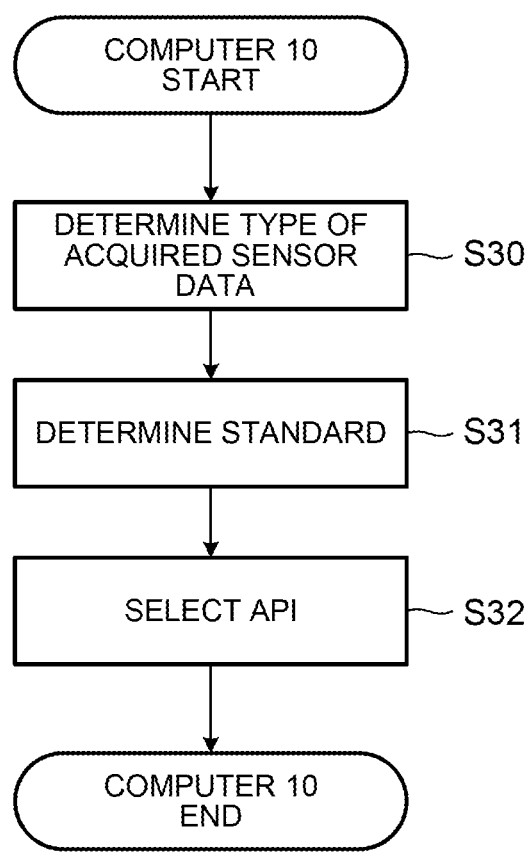
FIG. 6 shows a flow chart illustrating the API selection process performed by the computer 10.

The API selection process performed by the system for providing an API 1 will be described below with reference to FIG. 6. FIG. 6 shows a flow chart illustrating the API selection process performed by the computer 10. The tasks executed by the modules will be described below with this process.

The sensor data determination module 40 determines the type of the acquired sensor data (Step S30). In the step S30, the sensor data determination module 40 determines the type of the sensor data based on the identifier of the edge device 100 included in the acquired data. If acquiring two or more sensor data from one or more edge devices 100, the sensor data determination module 40 determines the types of the sensor data by performing data mining and the multivariate analysis on the sensor data based on the identifiers of the edge devices 100.

The standard determination module 41 determines the standard with the highest priority based on the above-mentioned standard database (Step S31). In the step S31, the standard determination module 41 determines the standard with the highest priority based on the standard database previously set by the user who is going to perform calculation this time.

The standard determination module 41 may determine not only the standard with the highest priory but also a predetermined number of standards.

The API selection module 42 selects an appropriate API for a calculation device 300 based on the determined type of the sensor data and the standard received from the user (Step S32). In the step S32, the API selection module 42 selects an appropriate API for a calculation device 300 by referring to the API database.

API Database

The API database that the memory module 30 stores will be described below with reference to FIG. 10. FIG. 10 shows one example of the API database. The memory module 30 associates and stores the name of the type of sensor data, the detail of a standard, the name of a calculation device 300 with an API. The "type" means the type of the sensor data that the edge device 100 acquires. The "standard" means the standard with the highest priority among the standards that the user terminal 200 receives. The "calculation device" means the identifier such as the name or the model number of a computer device that performs calculation. The "API" means the identifier such as the name of an application used for the calculation. The API database associates each of the standards received from the user with a calculation device 300 that meets the requirement of the standard and an API for this calculation device 300 for every type. The computer 10 acquires data corresponding to a standard from an external database, a provider's WEB sites, etc., and associates and stores an API for a calculation device 300 with sensor data and the standard based on the acquired data. Furthermore, for example, the computer 10 evaluates the API for a calculation device 300 that is specified by another user based on a standard and associates and stores the API for a calculation device 300 with sensor data and the standard based on this evaluation. Furthermore, the computer 10 learns a pair of the API for a calculation device 300 that is specified by another user and a standard as teacher data and generates learning data. Then, if acquiring an API for a new calculation device 300, new sensor data, etc., the computer 10 stores the acquired new data after the association based on the learning data.

The items of the API database are not limited to the above-mentioned examples. Other items may be added to the API database. For example, other standards may be received from a user and added. Furthermore, each item of the API database may be at least one of the fee for using, the processing speed, the user evaluation, the security, and the number of API users. The items are not limited to names and may be other identifiers to identify sensor data, a standard, a calculation device, and an API. The memory module 30 may have an API database for each type of sensor data.

In the step S31, the API selection module 42 refers to the API database based on the type of the determined sensor data and the determined standard with the highest priority and extracts the API for a calculation device 300 associated with these. The API selection module 42 selects the extracted calculation device 300 and the API for this calculation device 300. This allows the API selection module 42 to select an appropriate API for a calculation device 300 based on at least one of the standards when the user selects an appropriate API for a calculation device 300.

If the standard determination module 41 selects a predetermined number of standards in descending order according to priority, the API selection module 42 extracts the APIs for calculation devices 300 that are associated with the respective selected standards in the API database, ranks the APIs for these calculation devices 300 based on the priorities of the standards, and selects the APIs for calculation devices 300 together with the identifiers such as the numbers or signs that indicate the ranks in the descending order according to priority.

Recommendation Process

Figure 7:
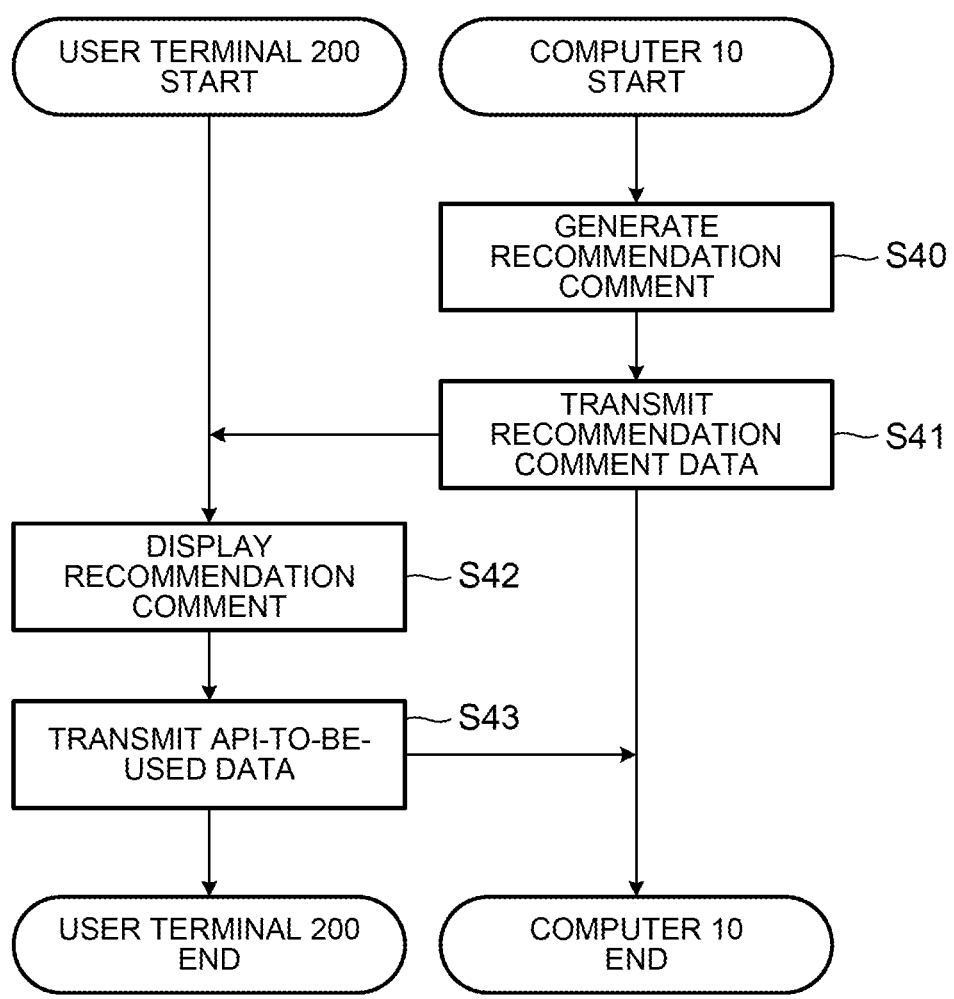
FIG. 7 shows a flow chart illustrating the recommendation process performed by the computer 10 and the user terminal 200.

The recommendation process performed by the system for providing an API 1 will be described below with reference to FIG. 7. FIG. 7 shows a flow chart illustrating the recommendation process performed by the computer 10 and the user terminal 200. The tasks executed by the modules of each of the above-mentioned devices will be explained below together with this process.

The recommendation comment generation module 43 generates a recommendation comment about an appropriate API for a calculation device 300 that the API selection module 42 selected in the above-mentioned step S31 (Step S40). In the step S40, the recommendation comment generation module 43 generates a recommendation comment containing the selected API for a calculation device 300 and the standard which is a reason to have selected the API for a calculation device 300.

The recommendation comment transmission module 22 transmits recommendation comment data as the generated recommendation comment to the user terminal 200 (Step S41).

The recommendation comment receiving module 251 receives the recommendation comment data. The display module 262 displays the recommendation comment based on the received recommendation comment data (Step S42).

Figure 11:
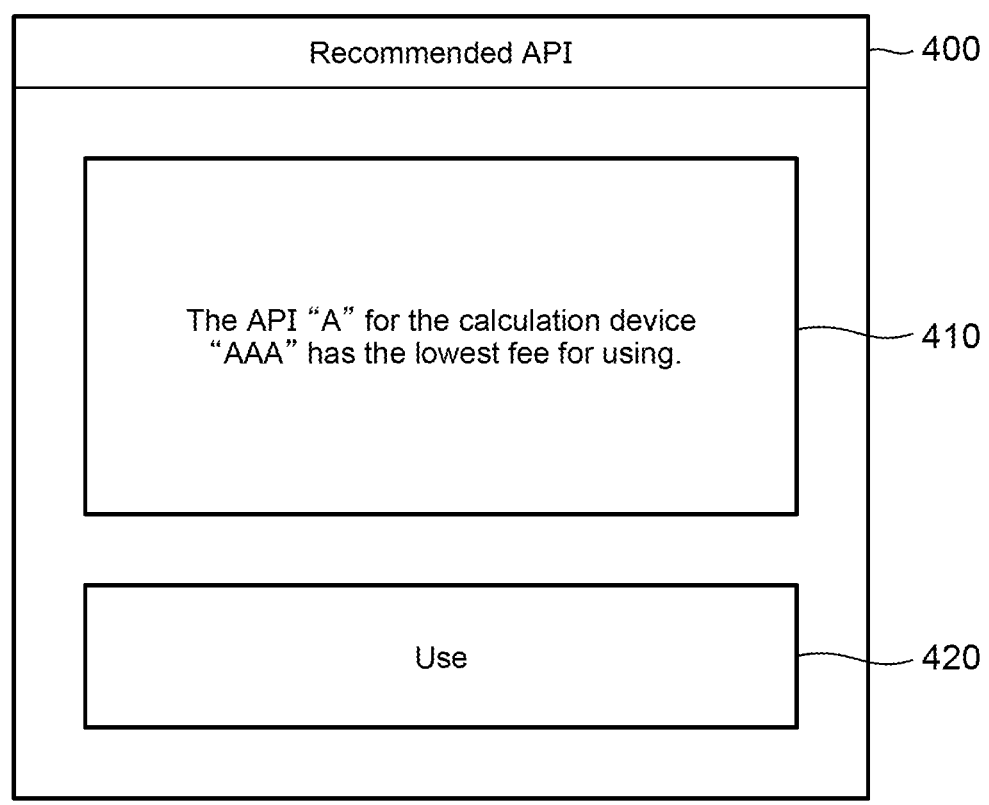
FIG. 11 shows one example of the recommendation comment screen 400.

The recommendation comment that the display module 262 displays will be described below with reference to FIG. 11. FIG. 11 shows one example of the recommendation comment screen 400. In FIG. 11, the display module 262 displays a recommendation comment 410 and a use icon 420 in the recommendation comment screen 400. The recommendation comment 410 displays the selected API for a calculation device 300 and the standard which is a reason to have selected the API for a calculation device 300. The use icon 420 receives an input from the user, performs the billing process necessary for the use of the API for a calculation device 300 that is displayed in the recommendation comment 410, and then performs the processes necessary to use the API for a calculation device 300.

Figure 12:
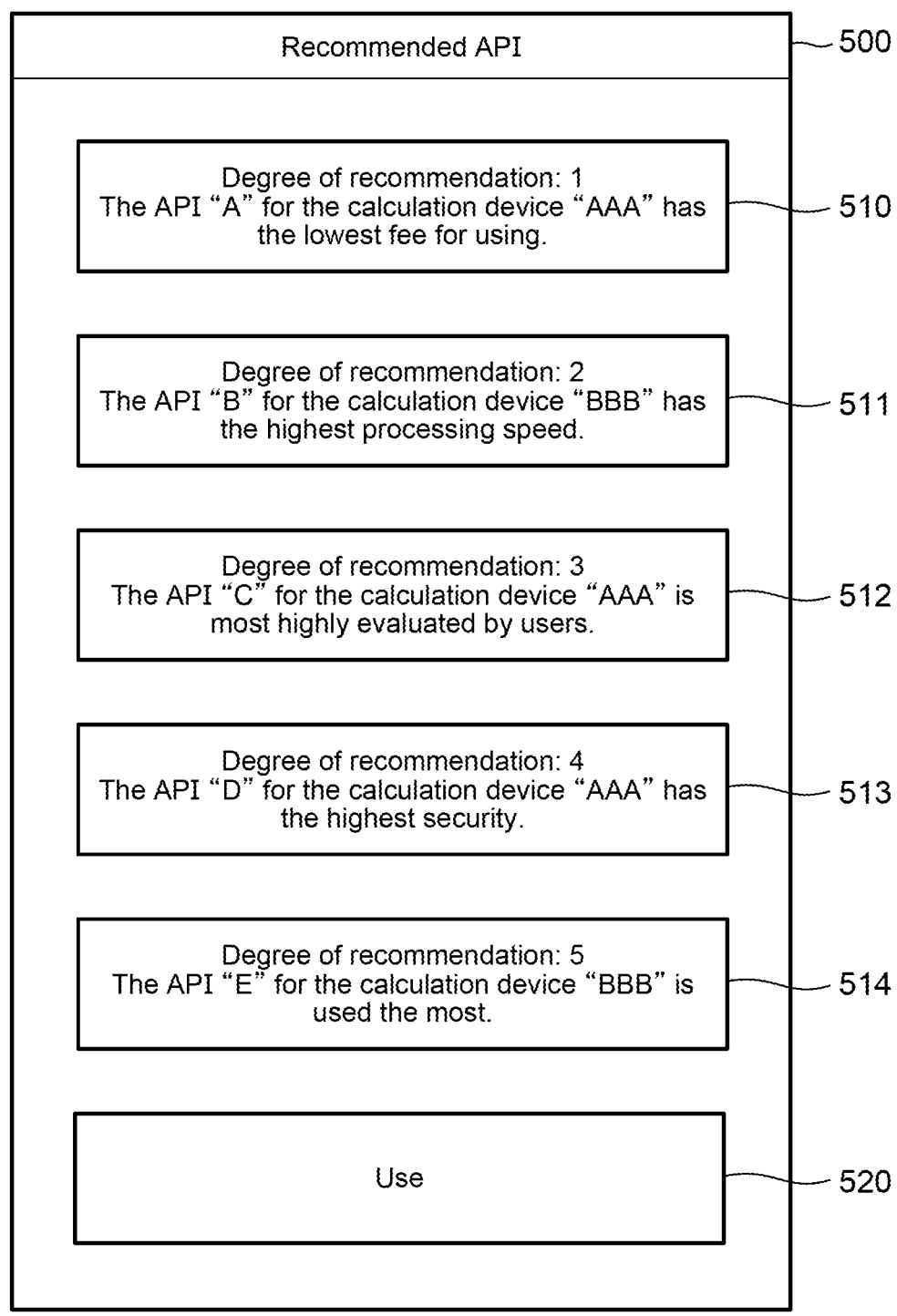
FIG. 12 shows one example of the recommendation comment screen 500.

The recommendation comment that the display module 262 displays will be described below with reference to FIG. 12. FIG. 12 shows one example of the recommendation comment screen 500. The difference of the recommendation comment screen 500 from the recommendation comment screen 400 shown in FIG. 11 is that an API for a calculation device 300 is selected based on two or more standards. In FIG. 12, the display module 262 displays recommendation comments 510 to 514 and a use icon 520 in the recommendation comment screen 500. The recommendation comments 510 to 514 each display the selected API for a calculation device 300, the standard which is a reason to have selected the API for a calculation device 300, and the degree of recommendation. The degree of recommendation is displayed as a number corresponding to the priority of each of the received standards. Specifically, the degree of recommendation with a small number is displayed for the API for a calculation device 300 that is selected based on the standard with a high priority. In FIG. 12, since the priorities in the standard database are in order of "fee for using," "processing speed," "user evaluation," "security," and "number of API users," the degrees of recommendation of the API for a calculation device 300 that is selected based on the fee for using, the processing speed, the user evaluation, the security, and the number of API users are displayed as 1, 2, 3, 4, and 5, respectively. The display module 262 receives an input to select any one of the recommendation comments 510 to 514. The use icon 520 receives an input from the user, performs the billing process necessary for the use of the API for a calculation device 300 in the selected one of the recommendation comments 510 to 514, and then performs the processes necessary to use the API for a calculation device 300.

The display module 262 is not limited to the above-mentioned examples and can appropriately change the number and the details of the displayed recommendation comments, for example, displays only the recommendation comment about the API for a calculation device 300 with the highest degree of recommendation or only a predetermine number of recommendation comments about the API for a calculation device 300 in the descending order according to the degree of recommendation. Furthermore, without displaying the use icon 520, the display module 262 may perform the process necessary to automatically use the API for a calculation device 300 about which the displayed recommendation comment is.

The API-to-be-used transmission module 252 transmits API-to-be-used data that indicates the API for a calculation device 300 that the user desires to the computer 10 (Step S43). In the step S43, the API-to-be-used transmission module 252 receives the API for a calculation device 300 that is selected or input from the use icon 420 that the display module 262 receives and transmits API-to-be-used data that indicates the API for a calculation device 300 that is selected from the use icon 520 to the computer 10.

The API-to-be-used receiving module 23 receives the API-to-be-used data.

Calculation Result Providing Process

Figure 8:
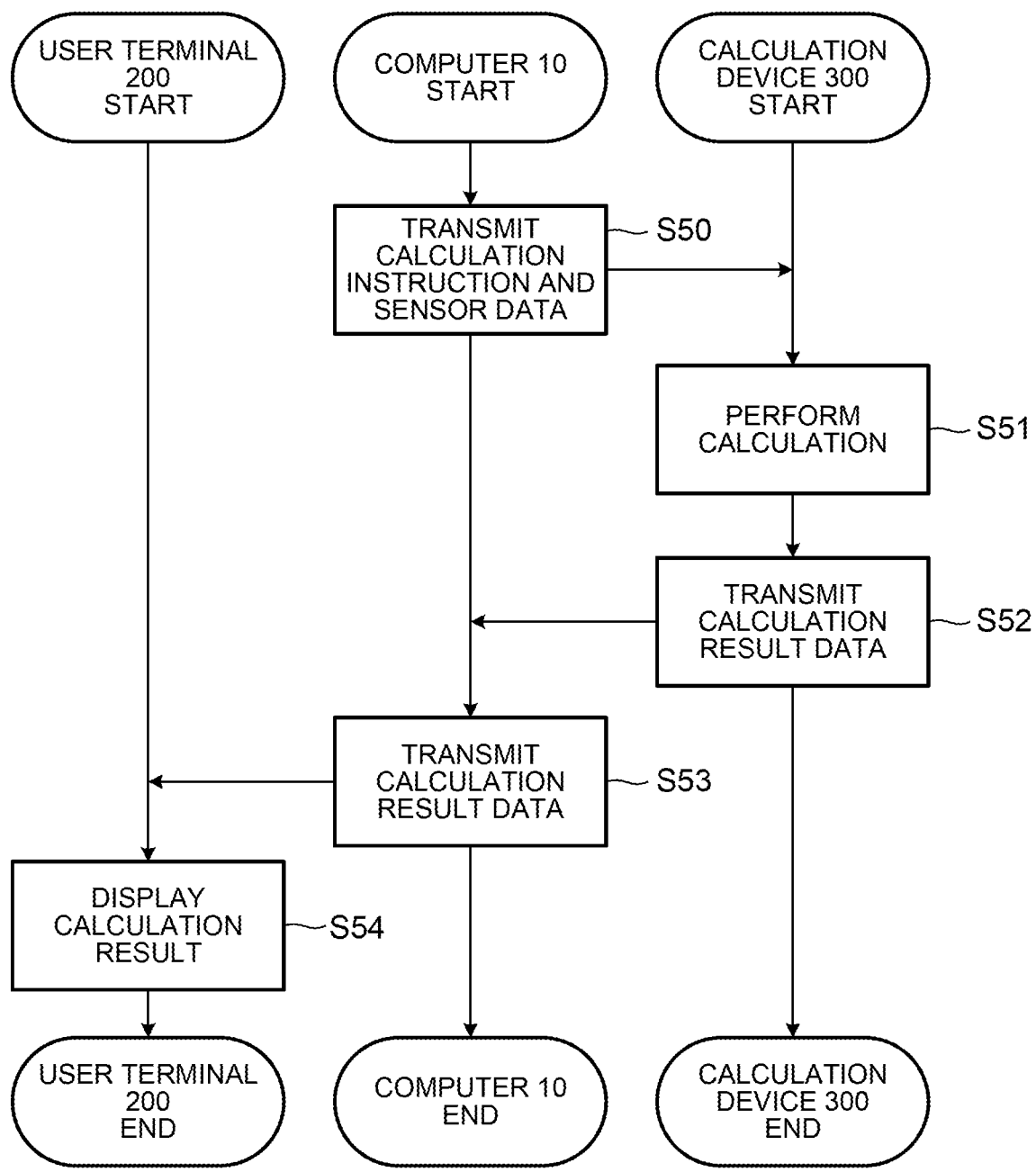
FIG. 8 shows a flow chart illustrating the calculation result providing process performed by the computer 10, the user terminal 200, and the calculation device 300.

The calculation result providing process performed by the system for providing an API 1 will be described below with reference to FIG. 8. FIG. 8 shows a flow chart illustrating the calculation result providing process performed by the computer 10, the user terminal 200, and the calculation device 300. The tasks executed by the modules of each of the above-mentioned devices will be explained below together with this process.

The calculation instruction transmission module 24 transmits a calculation instruction to use the selected API for a calculation device 300 and instruct the calculation device 300 to calculate and sensor data to the calculation device 300 (Step S50). In the step S50, the computer 10 uses the selected API for a calculation device 300 and controls the calculation device 300 to calculate, by transmitting a calculation instruction to the calculation device 300.

In the step S50, the calculation instruction transmission module 24 transmits a calculation instruction and sensor data to the API for a calculation device 300 that is selected in the above-mentioned step S32 or the API for a calculation device 300 that the user desires in the above-mentioned step S43. For example, if only the API for one calculation device 300 with the highest priority is selected, a calculation instruction and sensor data are transmitted to the API for a calculation device 300 that is selected in the above-mentioned step S32. If the APIs for two or more calculation devices 300 according to priority are selected, a calculation instruction and sensor data are transmitted to the APIs for calculation devices 300 that the user desires in the above-mentioned step S43.

The calculation instruction receiving module 350 receives the calculation instruction and the sensor data. The calculation module 360 performs necessary calculation on the sensor data (Step S51). In the step S51, the calculation module 360 performs necessary calculation by using the API included in the calculation instruction. For example, the calculation module 360 performs various calculations such as prediction of the harvest time of farm products, prediction of the necessity of pesticide, watering, etc.

The calculation result transmission module 351 transmits calculation result data that is the result of the calculation to the computer 10 (Step S52).

The device result receiving module 25 receives the calculation result data. The calculation result providing module 26 transmits the received calculation result data to the user terminal 200 (Step S53). In the step S53, the computer 10 provides the result from the calculation performed by the calculation device 300 by transmitting the calculation result data to the user terminal 200.

The calculation result receiving module 253 receives the calculation result data. The display module 262 displays the calculation result based on the received calculation result data.

To achieve the means and the functions that are described above, a computer (including a CPU, an information processor, and various terminals) reads and executes a predetermined program. For example, the program may be provided through Software as a Service (SaaS), specifically, from a computer through a network or may be provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

1 System for providing an API
10 Computer
100 Edge device
200 User terminal
300 Computer

What is claimed is:

1. A computer system comprising:
one or more processors that:
acquire sensor data from an edge device;
store a plurality of standards in a storage device, wherein each of the plurality of standards is previously received from a user;
associating each of the plurality of standards with a plurality of priorities respectively;
determining a first standard associated with a highest priority among the plurality of standards as the standard to be used to select a plurality of appropriate APIs;
select the plurality of appropriate APIs for a calculation device according to the acquired sensor data and the first standard based on which the plurality of appropriate API for the calculation device is selected;
generate a reason to have selected each of the plurality of appropriate APIs for the calculation device as a recommendation comment;
display each of the plurality of appropriate APIs for the calculation device and the recommendation comment thereon and receive a selection of an API for the calculation device from among the plurality of appropriate APIs;
control the calculation device to calculate a calculation result using the sensor data and by using the selected API for the calculation device; and
provide the calculation result.

2. The computer system according to claim 1, wherein the standard includes at least one of a fee for using the API, a processing speed, a user evaluation, a security, and a number of API users.

3. The computer system according to claim 1, wherein the one or more processors determine a type of the sensor data based on an identifier of the edge device, and select the plurality of appropriate APIs for the calculation device according to the type of the sensor data and the standard.

4. The method for providing an API that a computer system executes, comprising:
acquiring sensor data from an edge device;
store a plurality of standards in a storage device, wherein each of the plurality of standards is previously received from a user;
associating each of the plurality of standards with a plurality of priorities respectively;
determining a first standard associated with a highest priority among the plurality of standards as the standard to be used to select a plurality of appropriate APIs;
selecting the plurality of appropriate APIs for a calculation device according to the acquired sensor data and the first standard based on which the plurality of appropriate API for the calculation device is selected;
generating a reason to have selected each of the plurality of appropriate APIs for the calculation device as a recommendation comment;
displaying each of the plurality of appropriate APIs for the calculation device and the recommendation comment thereon and receiving a selection of an API for the calculation device from among the plurality of appropriate APIs;
controlling the calculation device to calculate a calculation result using the sensor data by using the selected API for the calculation device; and
providing the calculation result.

5. The method according to claim 4, further comprising determining a type of the sensor data based on an identifier of the edge device, wherein selecting the plurality of appropriate APIs for the calculation device includes selecting the plurality of appropriate APIs for the calculation device according to the type of the sensor data and the standard.

6. A non-transitory computer-readable medium that stores a program for causing a computer system to execute:
acquiring sensor data from an edge device;
store a plurality of standards in a storage device, wherein each of the plurality of standards is previously received from a user;
associating each of the plurality of standards with a plurality of priorities respectively;
determining a first standard associated with a highest priority among the plurality of standards as the standard to be used to select a plurality of appropriate APIs;
selecting the plurality of appropriate APIs for a calculation device according to the acquired sensor data and the first standard based on which the plurality of appropriate API for the calculation device is selected;
generating a reason to have selected each of the plurality of appropriate APIs for the calculation device as a recommendation comment;

displaying each of the plurality of appropriate APIs for the calculation device and the recommendation comment thereon and receiving a selection of an API for the calculation device from among the plurality of appropriate APIs;

controlling the calculation device to calculate a calculation result using the sensor data and by using the selected API for the calculation device; and providing the calculation result.

7. The non-transitory computer-readable medium according to claim 6, wherein the program causes the computer system to further execute further comprising determining a type of the sensor data based on an identifier of the edge device, wherein selecting the plurality of appropriate APIs for the calculation device includes selecting the plurality of appropriate APIs for the calculation device according to the type of the sensor data and the standard.

* * * * *